United States Patent
Ke

(10) Patent No.: US 11,659,604 B1
(45) Date of Patent: May 23, 2023

(54) WIRELESS COMMUNICATION METHOD AND WIRELESS COMMUNICATION DEVICE

(71) Applicant: ACTIONS TECHNOLOGY CO., LIMITED, Zhuhai (CN)

(72) Inventor: Haitao Ke, Zhuhai (CN)

(73) Assignee: ACTIONS TECHNOLOGY CO., LIMITED, Zhuhai (CN)

(*) Notice: Subject to any disclaimer, the term of this patent is extended or adjusted under 35 U.S.C. 154(b) by 0 days.

(21) Appl. No.: 17/916,044

(22) PCT Filed: Sep. 23, 2020

(86) PCT No.: PCT/CN2020/117083
§ 371 (c)(1),
(2) Date: Sep. 30, 2022

(87) PCT Pub. No.: WO2022/000817
PCT Pub. Date: Jan. 6, 2022

(30) Foreign Application Priority Data

Jun. 29, 2020 (CN) .......................... 202010609383.8

(51) Int. Cl.
*H04W 4/00* (2018.01)
*H04W 76/10* (2018.01)
*H04W 8/00* (2009.01)

(52) U.S. Cl.
CPC ........... *H04W 76/10* (2018.02); *H04W 8/005* (2013.01)

(58) Field of Classification Search
CPC .............................. H04W 76/10; H04W 8/005
See application file for complete search history.

(56) References Cited

U.S. PATENT DOCUMENTS

| 10,341,758 | B1 | 7/2019 | Tong et al. | |
| 2018/0184234 | A1 | 6/2018 | Chen et al. | |
| 2019/0007763 | A1 | 1/2019 | Rich et al. | |
| 2020/0107387 | A1* | 4/2020 | Li | H04B 17/318 |
| 2020/0296793 | A1* | 9/2020 | Cheong | H04W 88/06 |
| 2021/0282207 | A1* | 9/2021 | Cheong | H04W 84/18 |
| 2022/0015169 | A1* | 1/2022 | Xu | H04W 84/18 |

FOREIGN PATENT DOCUMENTS

| CN | 107820325 A | 3/2018 |
| CN | 110191391 A | 8/2019 |
| CN | 110213691 A | 9/2019 |
| CN | 110383767 A | 10/2019 |
| CN | 110995326 A | 4/2020 |
| CN | 111132110 A | 5/2020 |
| CN | 111163450 A | 5/2020 |

\* cited by examiner

*Primary Examiner* — Justin Y Lee
(74) *Attorney, Agent, or Firm* — Bayramoglu Law Offices LLC

(57) ABSTRACT

A wireless communication method includes establishing a first communication link between a source device and a first device, switching a second device into a shadow device of the first device after obtaining link information of the first communication link by the second device, and interacting the second device with the first device through the first communication link. A wireless communication is further provided. By adopting technical solutions above, a communication connection mode between multiple devices is simplified, and wireless communication between multiple devices is further realized.

19 Claims, 5 Drawing Sheets

WIRELESS COMMUNICATION METHOD AND WIRELESS COMMUNICATION DEVICE

CROSS REFERENCE TO THE RELATED APPLICATIONS

This application is the national phase entry of International Application No. PCT/CN2020/117083, filed on Sep. 23, 2020, which is based upon and claims priority to Chinese Patent Application No. 202010609383.8, filed on Jun. 29, 2020, the entire contents of which are incorporated herein by reference.

TECHNICAL FIELD

The present disclosure relates to the field of communication technologies, and in particular to a wireless communication method and a wireless communication device.

BACKGROUND

In current wireless communication technologies, many products have cooperation work between multiple devices, and a lot of information interaction needs to be performed between devices. For example, in our common wireless stereo headphone disclosure, a mobile phone is wirelessly connected with a master device and a slave device of a Bluetooth true wireless stereo (TWS) device through Bluetooth, which involves a connection of three devices including the mobile phone, a TWS master headset, and a TWS slave headset, or a connection of similar devices such as Bluetooth speakers. Each connection between these multiple devices needs to establish an actual communication link, and then relies on the actual link to transmit data information between the devices, such as audio data.

Interaction between multiple devices in the related art generally has following several ways. First, in a connection relationship established as shown in FIG. 1, an actual communication link 1 is established between a data source device and a device 1, and an actual communication link 2 is established between the device 1 and a device 2, an addition of the actual communication link 2 may divide original time slices belonging to link 1, while complexity of a system including the actual communication link 1 and the actual communication link 2 increases, etc., and the communication links become more complex along with increasing of the devices. Second, in a connection relationship established as shown in FIG. 2, each device communicates with each other in a form of broadcast by one device or multiple devices, a device 1 transmits information that needs to be notified to a device 2, a device 3, and a device 4 in a broadcast mode, the way needs to introduce a broadcast communication mode, and also occupies time slices between the data source device and the device 1, and logical complexity of an entire communication system may also be correspondingly increased.

SUMMARY

In view of this, a main purpose of the present disclosure is to provide a wireless communication method, which is able to simplify a communication connection mode between multiple devices.

An embodiment of the present disclosure is implemented as follows, a wireless communication method, including:

establishing a first communication link between a source device and a first device;
obtaining link information of the first communication link by a second device, and switching the second device into a shadow device of the first device; and
interacting the second device with the first device through the first communication link, Furthermore, a step of interacting the second device with the first device through the first communication link includes:

obtaining communication data and interacting with the first device, by the second device, when the first device sends the communication data to the source device.

Furthermore, the wireless communication method further includes:

entering the second device into a specific discovery mode, and accessing the first communication link through a specific access code of the specific discovery mode.

Furthermore, the specific access code includes an identification number or an identification code, the identification number or the identification code are pre-agreed between the second device and the first device.

Furthermore, a step of obtaining the communication data and interacting with the first device, by the second device, includes:

monitoring the communication data by the second device, where the communication data is in the first communication link; the communication data is interaction data in a specific format in the first communication link, and the interaction data in the specific format is information, where the information needs to be interacted between the first device and the second device.

Furthermore, the interaction data in the specific format includes an ID number of the interaction data, a length of the interaction data, and content of the interaction data.

Furthermore, the second device comprises at least one wireless communication device, and respectively switching the at least one wireless communication device into the shadow device of the first device after obtaining the link information of the first communication link by the at least one wireless communication device.

Furthermore, the wireless communication method further includes:

dynamically setting an interaction frequency between the first device, the source device, and/or the second device according to usage scenarios.

Furthermore, a step of dynamically setting the interaction frequency between the first device, the source device, and/or the second device according to the usage scenarios includes:

when the first device is a master in the first communication link, selecting a preset quality of service parameter and adjusting a poll period, by the first device; or
when the first device is a slave in the first communication link, selecting the preset quality of service parameter, obtaining a response consent of the source device, and then adjusting the poll period, by the first device; or
adjusting a sniff period of the first communication link.

Furthermore, the wireless communication method further includes:

performing a relationship switching between the second device and the first device.

Furthermore, the wireless communication method further includes:

switching the second device into a receiving time sequence, and receiving data sent by the first device to the source device, by the second device.

In another aspect, the present disclosure further provides a wireless communication device, which is able to simplify a communication connection mode between multiple devices.

One embodiment of the wireless communication device of the present disclosure is implemented as follows, including an obtaining device, a switching device, and an interaction device. The obtaining device is configured to obtain link information of a first communication link established between a source device and a first device, the switching device is configured to be switched into a shadow device of the first device according to the link information of the first communication link, and the interaction device is configured to interact with the first device through the first communication link.

Furthermore, the interaction device further includes a monitoring device. The monitoring device is configured to obtain communication data and interact with the first device when the first device sends the communication data to the source device, the communication data is interaction data in a specific format in the first communication link, and the interaction data in the specific format is information, where the information needs to be interacted between the first device and the second device.

According to above technical solutions, the embodiments of the present disclosure have following effects: at least one second device obtains communication link information between the source device and the first device, so that a state of the at least one second device is able to be changed into the shadow device of the first device, and the communication data between the first device and the source device is obtained by becoming a shadow device. The second device use a specific access code to access the first communication link through a specific discovery mode to obtain the interaction data that the first device needs to transmit to the second device. By adopting the technical solutions, wireless communication between multiple devices is able to be realized without adding an additional communication mode, but only by properly borrowing a current communication link path.

BRIEF DESCRIPTION OF THE DRAWINGS

Other features, objects and advantages of the present disclosure become more apparent upon reading detailed description of non-limiting embodiments with reference to the following drawings.

DETAILED DESCRIPTION OF THE EMBODIMENTS

The present disclosure is further described in detail below with reference to the accompanying drawings and embodiments. it's understandable that specific embodiments described are merely used for explaining the relevant disclosure, rather than limiting the present disclosure. In addition, it should be noted that, for convenience of description, only a part related to the present disclosure is shown in the accompanying drawings.

It should be noted that, in a case of no conflict, embodiments in the present disclosure and features in the embodiments may be combined with each other. The present disclosure is described in detail below with reference to the accompanying drawings and in combination with the embodiments, and an order of steps in the following embodiments is merely an example, and may be adjusted without conflict.

Figure 1:
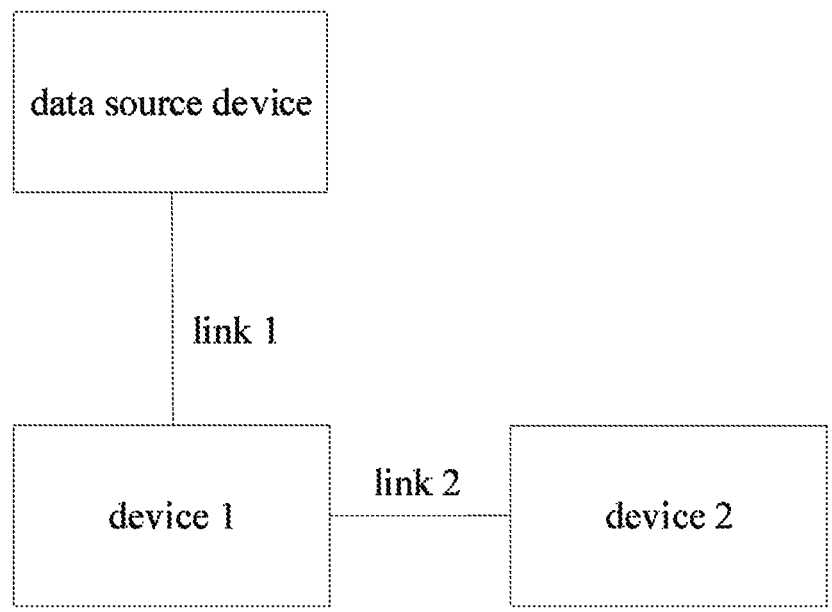
FIG. 1 is a schematic diagram of a wireless communication mode between multiple devices according to the related art.
Figure 2:
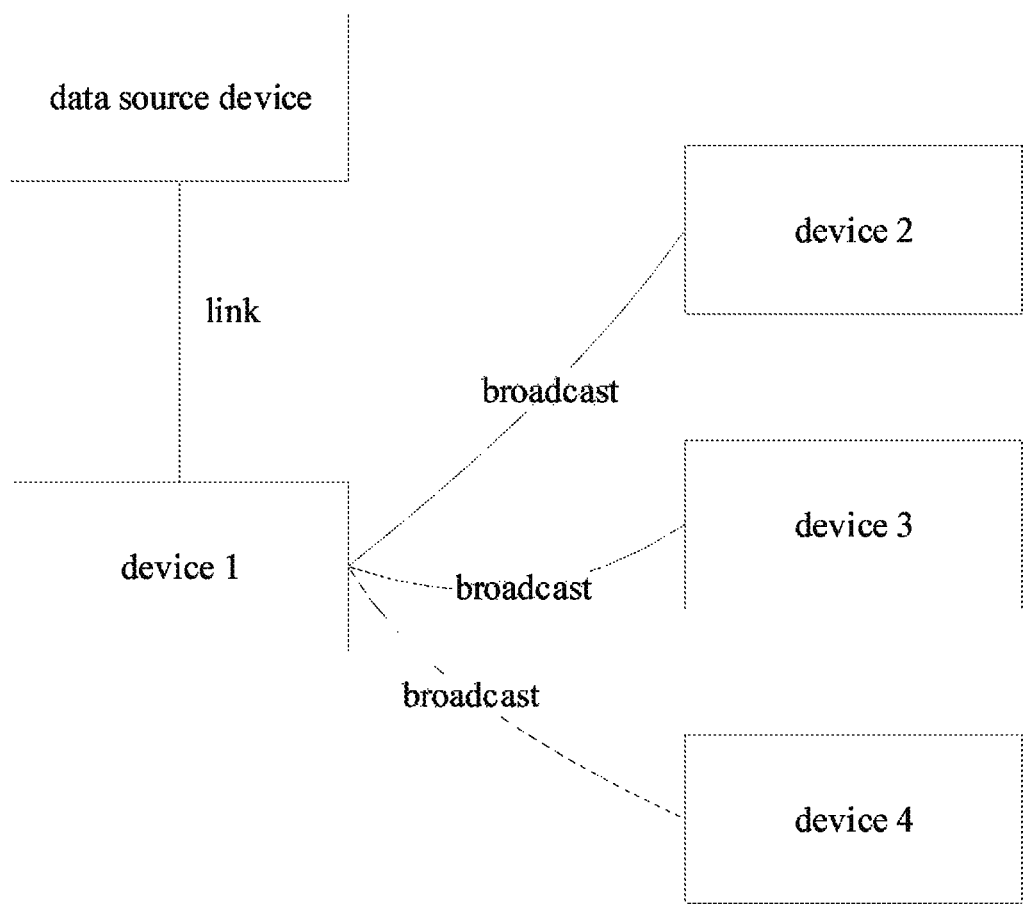
FIG. 2 is a schematic diagram of another wireless communication mode between multiple devices according to the related art.
Figure 3:
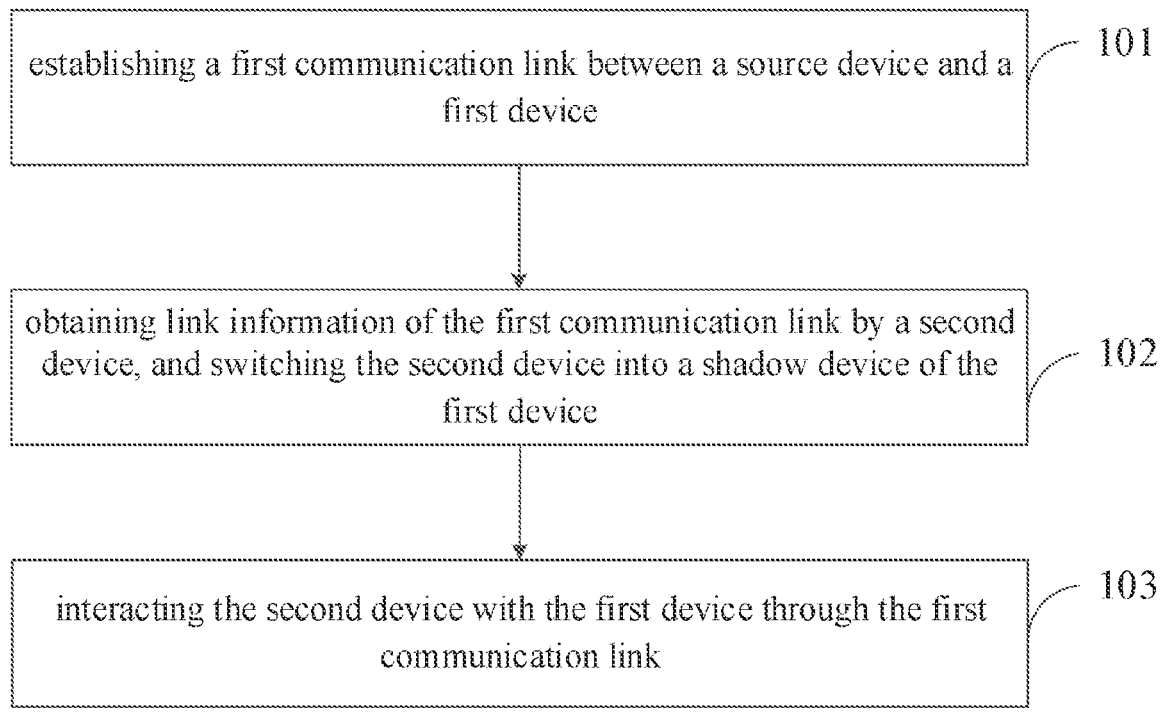
FIG. 3 is a flowchart of a wireless communication method according to the present disclosure.

As shown in FIG. 3, FIG. 3 is a wireless communication method according to an embodiment of the present disclosure, including the following steps:

S101: establishing a first communication link between a source device and a first device.

S102: obtaining link information of the first communication link by a second device, and switching the second device into a shadow device of the first device.

S103: interacting the second device with the first device through the first communication link.

The first communication link is established between the source device and the first device, and the communication data is able to be sent between the source device and the first device, for example, after the communication link is established between the first device and the source device, the first device is able to receive audio data, voice data, and other data sent by the source device. When the second device needs to join a communication network with the first device and the source device, the second device obtains the link information of the first communication link, and then the second device switches its own state into the shadow device of the first device, and the second device interacts with the first device through the first communication link. The shadow device is relative to the first device, that is, the second device has two states or forms at different times, the second device is in one state before switching to the shadow device of the first device, and is in another state after switching to the shadow device. The second device obtains communication link information parameter set(s) of the first communication link established by the source device and the first device, so that the second device is able to monitor or eavesdrop the communication data of the first communication link, so as to realize that the first device is able to interact with the second device as the shadow device. After the second device obtains the communication link information parameter set(s) of the first communication link and then switches to the shadow device, the second device is able to pretend to be same as the first device, and monitor the communication data in the first communication link, so that data of interaction information that the first device needs to interact with the second device can also be obtained, so as to implement information interaction between the first device and the second device.

Figure 4:
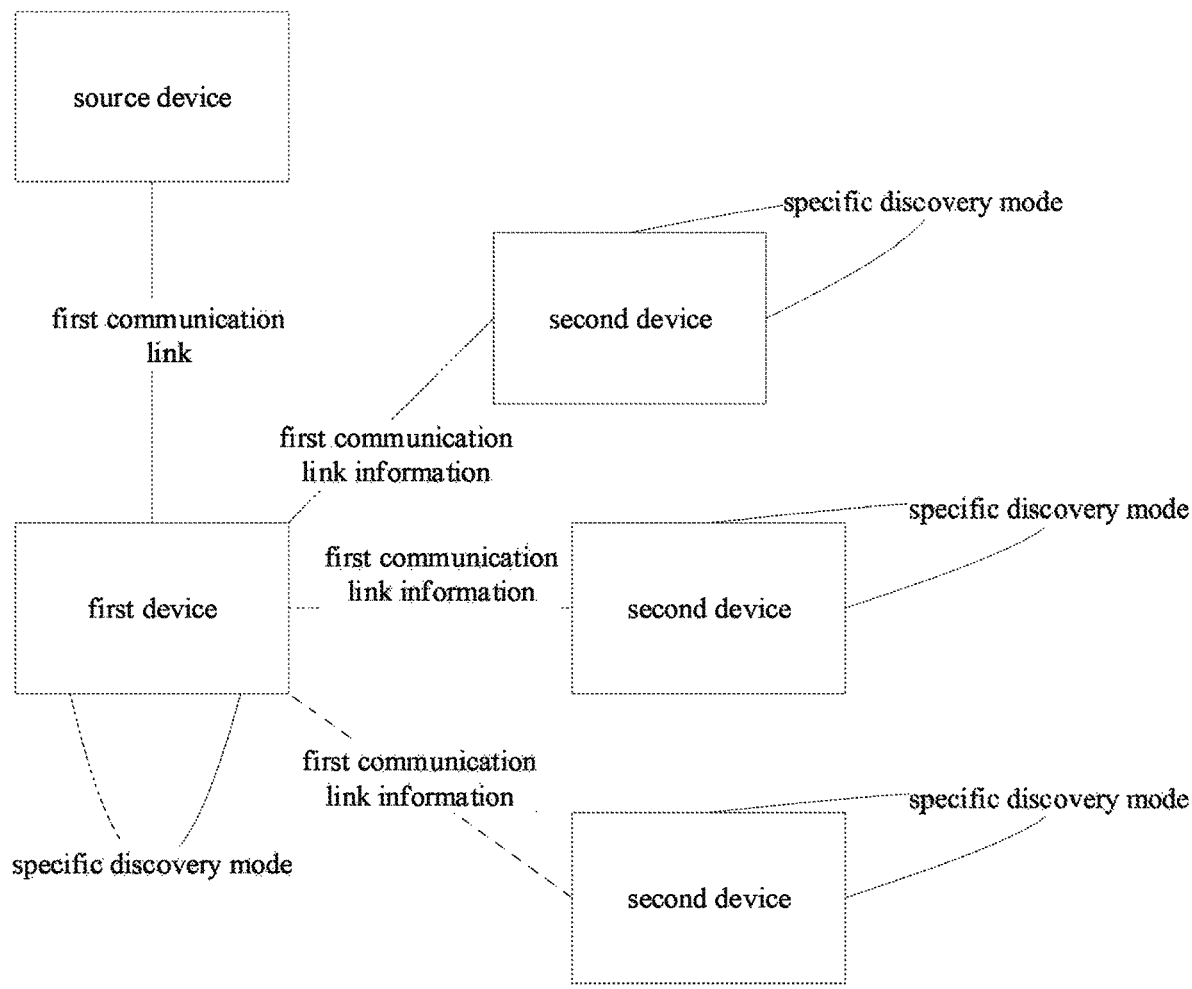
FIG. 4 is a schematic diagram of the wireless communication method according to the present disclosure.

According to an optional embodiment of the present disclosure, in a flow of the above embodiment, the step of the second device interacting with the first device through the first communication link specifically includes: when the first device sending communication data to the source device, the second device obtaining the communication data and interacting with the first device. In the embodiment, when the first device wants to perform data interaction with the second device, data transmission is not directly performed to the second device, but the first device sends the communication data to the source device through the first communication link, at this time, the second device monitors the communication data of sent to the source device as the state of the shadow device, in this way, the interaction of the first device to send the communication data to the second device is completed. As shown in FIG. 4, a communication network relationship between multiple devices is described in detail. In an embodiment, the second device entering a specific discovery mode, and the specific discovery mode accessing the first communication link by using a specific access code. The link information between the source device and the first device is obtained through the specific discovery mode, the first device enters the specific discovery mode through external event triggering, a preset key or a predetermined instruction etc., and at this time, the second device changes itself into the shadow device of the first device, so as to monitor transmission data between the first device and the source device. The specific access code is an identification number or an identification code pre-agreed between the second device and the first device, and is used for realizing agreed interaction between the second device and the first device. The specific discovery mode is a search and scanning access method using the specific access code.

Figure 5:
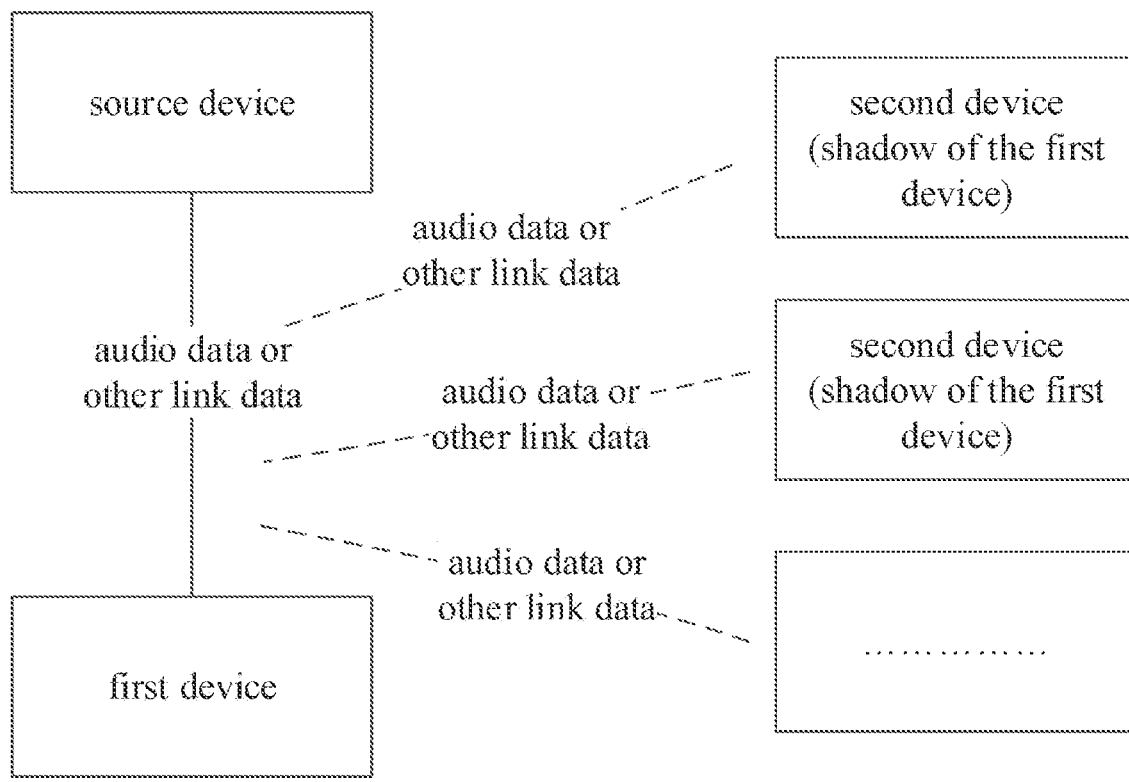
FIG. 5 is a schematic diagram of another wireless communication method according to the present disclosure.
Figure 6:
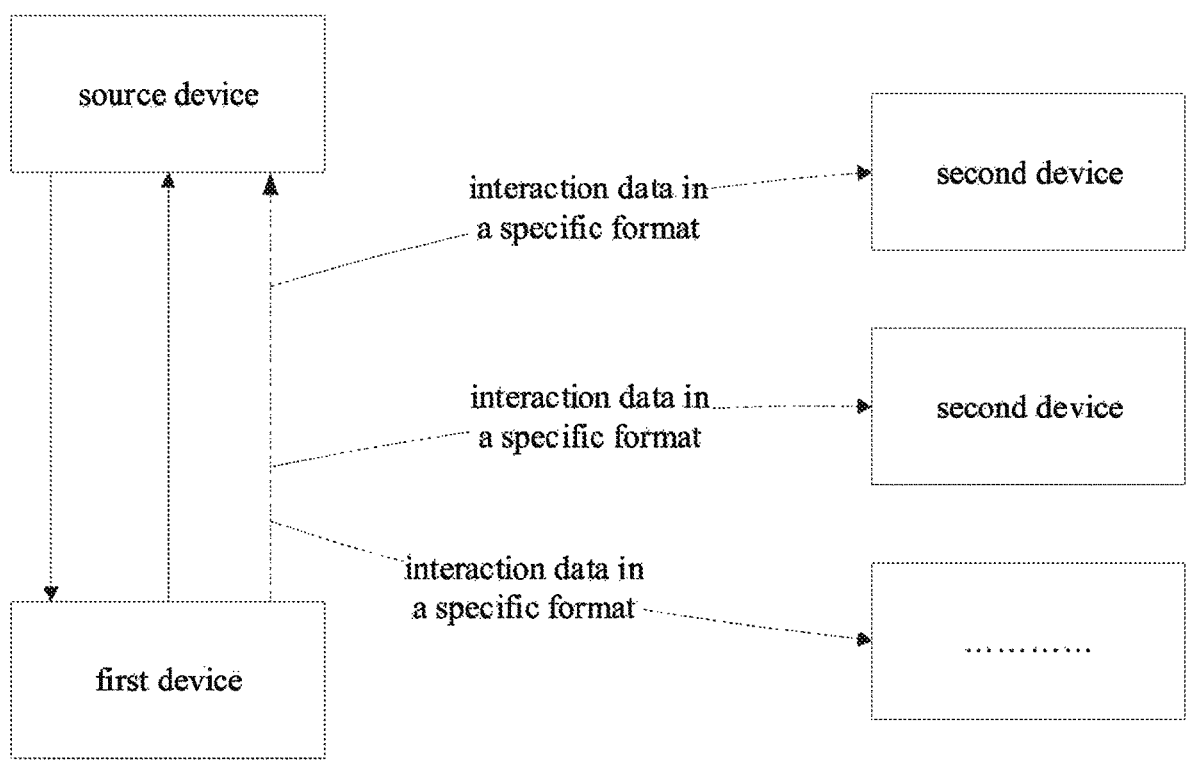
FIG. 6 is a schematic diagram of another wireless communication method according to the present disclosure.

The present disclosure provides another embodiment, as shown in FIG. 6, the step of the second device obtaining the communication data and interacting with the first device includes: the second device monitoring the communication data in the first communication link, the communication data is interaction data in a specific format in the first communication link, and the interaction data in the specific format is information that needs to be interacted between the first device and the second device. In actual use, the first device needs to perform data interaction with the second device, for example, it needs to agree to play or other applications, as shown in FIG. 5, a format or a scene may be deployed or set according to situations.

The first device sends the interaction data in the specific format to the source device through a current path between the first device and the source device, and when the first device sends the interaction data in the specific format to the source device, the second device switches to the receiving time sequence as the shadow device at this time, and receives the data sent by the first device to the source device. The second device receives the data sent by the first device, so as to achieve a purpose of exchanging information between the first device and the second device. The interaction data in the specific format sent by the first device to the source device in the first communication link is the data information that the first device wants to interact with the second device. In the first communication link, the source device does also receive these data, but the source device may not know true meaning of these data due to a lack of the specific access code. Of course, in a design, the source device may also be preset to understand the specific discovery mode, so the source device may accurately analyze the interaction information in the specific format. In actual transmission, a format of the interactive data in the specific format is shown in Table 1 below, which includes an ID number of the interaction data "Data ID", a length of the interaction data "Data Len", and content of the interaction data "data".

TABLE 1

| Data type | Data id | Data len | data |
| --- | --- | --- | --- |

According to an optional embodiment of the present disclosure, the second device includes at least one wireless communication device, and the at least one wireless communication device respectively obtaining link information of the first communication link and then switching to the shadow device of the first device. As shown in FIG. 4, FIG. 5, and FIG. 6, the second device may be one or more wireless communication devices, when each wireless communication device needs to interact with the first device, it can change itself into the shadow device of the first device through a solution of any of the above embodiments, so that each second device can monitor the communication data between the first device and the source device to implement the data interaction between the first device and itself.

Further, the method further includes: dynamically setting an interaction frequency between the first device, the source device, and/or the second device according to usage scenarios. Specifically, following situations are included:

When the first device is a master in the first communication link, the first device selecting a preset quality of service parameter and adjusting a poll period. After establishing a connection between the first device and the source device, the first device acts as a master role, and then the first device may select a corresponding quality of service parameter to adjust the Poll period, thereby ensuring that the data sent by the first device to the source device is able to be transmitted as soon as possible, so as to ensure the frequency of the data interaction between the first device and the second device.

When the first device is a slave in the first communication link, the first device selecting the preset quality of the service parameter, obtaining a response consent of the source device, and then adjusting the poll period. The connection is established between the first device and the source device, the first device acts as a slave role, and then the first device may select a corresponding quality of the service parameter, interact with the source device at same time, and adjust the poll period after obtaining the response from the source device, so as to ensure the frequency of the data interaction between the first device and the second device.

Adjusting a sniff period of the first communication link, and also adjust a sniff period between the first device and the source device, so as to ensure the frequency of the data interaction between the first device and the second device.

According to an optional embodiment of the present disclosure, on a basis of the above embodiment, a relationship between the second device and the first device is switched. Specifically, after the first communication link is established between the first device and the source device, the second device switches to become the shadow device of the first device. If it is necessary to exchange roles of the first device and the second device in the state of the shadow device at this time, the first device and the second device agree on a timing point for exchange, and when the time point is reached, the second device becomes a real device that interacts with the source device to establish a real link communication, and the first device becomes the shadow device of the second device.

According to another aspect of an embodiment of the present disclosure, the embodiment of the present disclosure further provides a wireless communication device. The wireless communication device described in the embodiment mainly refers to the second device that may be switched into the state of the shadow device in the above wireless communication method. The embodiment of the present disclosure is implemented as follows, the wireless communication device includes an obtaining device, a switching device, and an interaction device. The obtaining device is configured to obtain link information of a first communication link established between a source device and a first device, the switching device is configured to be switched into a shadow device of the first device according to the link information of the first communication link, and the interaction device is configured to interact with the first device through the first communication link Specifically, a first communication link is established between the source device and the first device in an external communication network, and communication data may be sent between the source device and the first device. For example, after the communication link is established between the first device and the source device, the first device is able to receive audio data, voice data, and other data sent by the source device. When the wireless communication device in the embodiment of the present disclosure needs to join the communication network with the first device and the source device, the link information of the first communication link is obtained by the obtaining device, the switching device switches its own state into the shadow device of the first device according to the link information of the first communication link, the interaction device enables the wireless communication device to interact with the first device through the first communication link. The shadow device is relative to the first device, that is, the wireless communication device has two states or forms at different times. The obtaining device obtains the communication link information parameter set(s) of the first communication link established by the source device and the first device, the interaction device interacts the communication data in the first communication link, so as to realize that the first device is able to interact with the wireless communication device as the shadow device. After the obtaining device obtains the communication link information parameter set(s) of the first communication link, and then the switching device switches itself as the shadow device to pretend to be same as the first device, and the interaction device monitors the communication data in the first communication link, so that data of interaction information that the first device needs to interact with the wireless communication device can also be obtained, so as to implement information interaction between the wireless communication device and the first device.

The embodiments of the present disclosure also provides an optional embodiment, on a basis of the above embodiment, the wireless communication device further includes a monitoring device, configured to obtain communication data and interact with the first device when the first device sends the communication data to the source device, the communication data is interaction data in a specific format in the first communication link, and the interaction data in the specific format is information that needs to be interacted between the first device and the second device.

Specifically, when the first device wants to perform data interaction with the the wireless communication device provided by the embodiment of the present disclosure, data transmission is not directly performed, but the first device sends the communication data to the source device through the first communication link, the wireless communication device monitors the communication data of sent by the first device to the source device as the state of the shadow device, in this way, the interaction of the first device to transmit the communication data to the wireless communication device is completed. As shown in FIG. 4, the wireless communication device (the second device in the FIG. 4) enters a specific discovery mode, and uses a specific access code to access the first communication link. The obtaining device obtains the link information between the source device and the first device through the specific discovery mode, the first device enters the specific discovery mode through external event triggering, a preset key or a predetermined instruction etc., and at this time, the switching device changes the wireless communication device itself to the shadow device of the first device, so as to monitor transmission data between the first device and the source device.

The embodiments of the present disclosure related to a part of the wireless communication device have been described in detail in the above method flow, and details are not described again.

The above description is only preferred embodiments of the present disclosure and an illustration of the applied technical principles. Those skilled in the art should understand that a scope of the invention involved in the present disclosure is not limited to the technical solutions formed by the specific combination of the above technical features, and other technical solutions formed by any combination of the above technical features or equivalent features thereof should also be covered without departing from the inventive concept. For example, a technical solution is formed by replacing the above features with the technical features disclosed in this disclosure (but not limited to) having similar functions.

What is claimed is:

1. A wireless communication method, comprising:
    establishing a first communication link between a source device and a first device;
    obtaining link information of the first communication link by a second device, and switching the second device into a shadow device of the first device;
    entering the second device into a specific discovery mode, and accessing the first communication link through a specific access code of the specific discovery mode; and
    interacting the second device with the first device through the first communication link.

2. The wireless communication method according to claim 1, wherein a step of interacting the second device with the first device through the first communication link comprises:
    obtaining communication data and interacting with the first device, by the second device, when the first device sends the communication data to the source device.

3. The wireless communication method according to claim 2, wherein a step of obtaining the communication data and interacting with the first device, by the second device comprises:
    monitoring the communication data by the second device, where the communication data is in the first communication link; the communication data is interaction data in a specific format in the first communication link, and the interaction data in the specific format is information, where the information needs to be interacted between the first device and the second device.

4. The wireless communication method according to claim 3, wherein the interaction data in the specific format comprises an ID number of the interaction data, a length of the interaction data, and content of the interaction data.

5. The wireless communication method according to claim 4, wherein the second device comprises at least one wireless communication device; and respectively switching the at least one wireless communication device into the shadow device of the first device after obtaining the link information of the first communication link by the at least one wireless communication device.

6. The wireless communication method according to claim 3, wherein the second device comprises at least one wireless communication device; and respectively switching the at least one wireless communication device into the shadow device of the first device after obtaining the link information of the first communication link by the at least one wireless communication device.

7. The wireless communication method according to claim 3, further comprising:
dynamically setting an interaction frequency between the first device, the source device, and/or the second device according to usage scenarios.

8. The wireless communication method according to claim 2, wherein the second device comprises at least one wireless communication device; and respectively switching the at least one wireless communication device into the shadow device of the first device after obtaining the link information of the first communication link by the at least one wireless communication device.

9. The wireless communication method according to claim 2, further comprising:
dynamically setting an interaction frequency between the first device, the source device, and/or the second device according to usage scenarios.

10. The wireless communication method according to claim 1, wherein the specific access code comprises an identification number or an identification code, wherein the identification number or the identification code are pre-agreed between the second device and the first device.

11. The wireless communication method according to claim 10, wherein the second device comprises at least one wireless communication device; and respectively switching the at least one wireless communication device into the shadow device of the first device after obtaining the link information of the first communication link by the at least one wireless communication device.

12. The wireless communication method according to claim 10, further comprising:
dynamically setting an interaction frequency between the first device, the source device, and/or the second device according to usage scenarios.

13. The wireless communication method according to claim 1, wherein the second device comprises at least one wireless communication device; and respectively switching the at least one wireless communication device into the shadow device of the first device after obtaining the link information of the first communication link by the at least one wireless communication device.

14. The wireless communication method according to claim 1, further comprising:
dynamically setting an interaction frequency between the first device, the source device, and/or the second device according to usage scenarios.

15. The wireless communication method according to claim 14, wherein a step of dynamically setting the interaction frequency between the first device, the source device, and/or the second device according to the usage scenarios comprises:
when the first device is a master in the first communication link, selecting a preset quality of service parameter and adjusting a poll period, by the first device; or
when the first device is a slave in the first communication link, selecting the preset quality of service parameter, obtaining a response consent of the source device, and then adjusting the poll period, by the first device; or
adjusting a sniff period of the first communication link.

16. The wireless communication method according to claim 1, further comprising:
performing a relationship switching between the second device and the first device.

17. The wireless communication method according to claim 1, further comprising:
switching the second device into a receiving time sequence, and receiving data sent by the first device to the source device, by the second device.

18. A wireless communication device, comprising:
an obtaining device;
a switching device; and
an interaction device;
wherein the obtaining device is configured to obtain link information of a first communication link established between a source device and a first device; the switching device is configured to enter a specific discovery mode and be switched into a shadow device of the first device according to the link information of the first communication link, wherein the first communication link is accessed through a specific access code of the specific discovery mode; and the interaction device is configured to interact with the first device through the first communication link.

19. The wireless communication device according to claim 18, further comprising:
a monitoring device;
wherein the monitoring device is configured to obtain communication data and interact with the first device when the first device sends the communication data to the source device, the communication data is interaction data in a specific format in the first communication link, and the interaction data in the specific format is information, where the information needs to be interacted between the first device and the wireless communication device.

* * * * *